F. M. STOLL.
COLLAPSIBLE BED.
APPLICATION FILED FEB. 24, 1919.
1,327,886.
Patented Jan. 13, 1920.
2 SHEETS—SHEET 1.
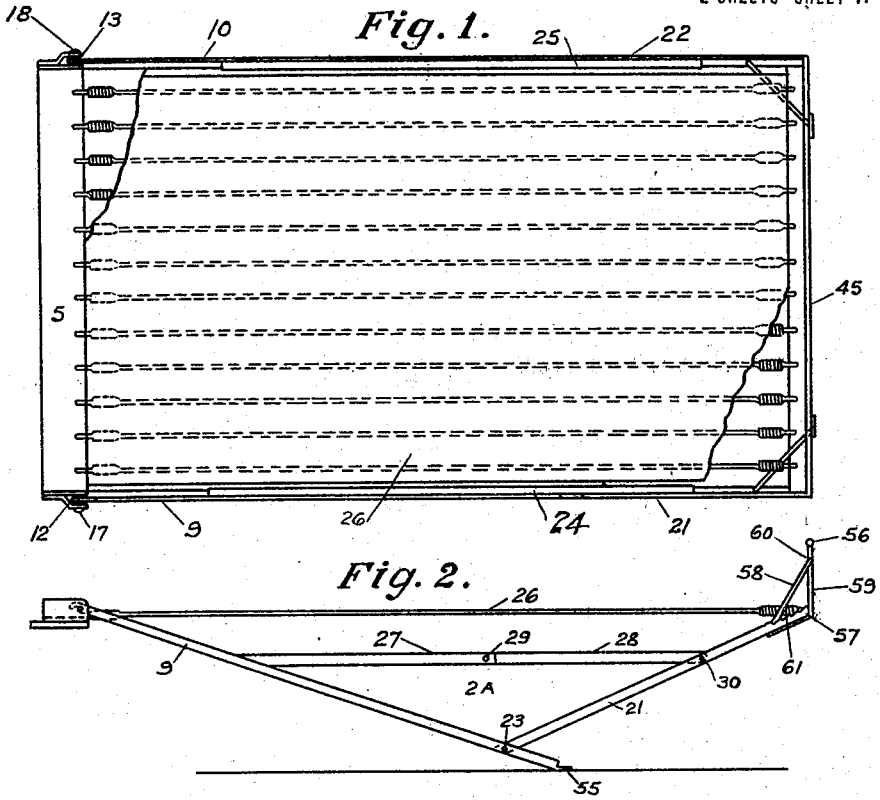
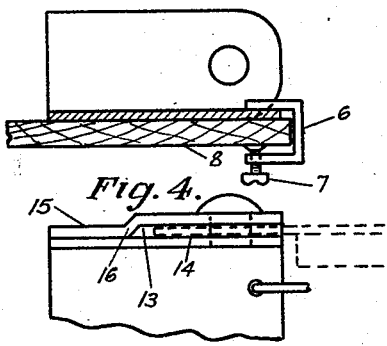
Frank M Stoll
INVENTOR.
BY
Jno. G. Powell
ATTORNEYS.

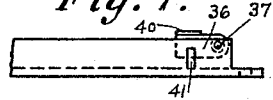
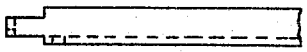
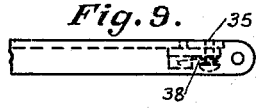
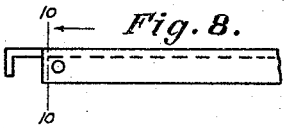
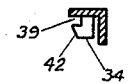
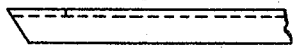
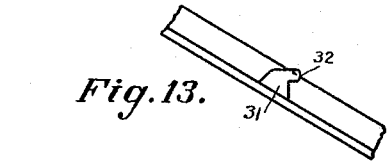
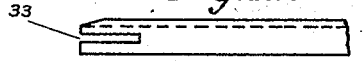
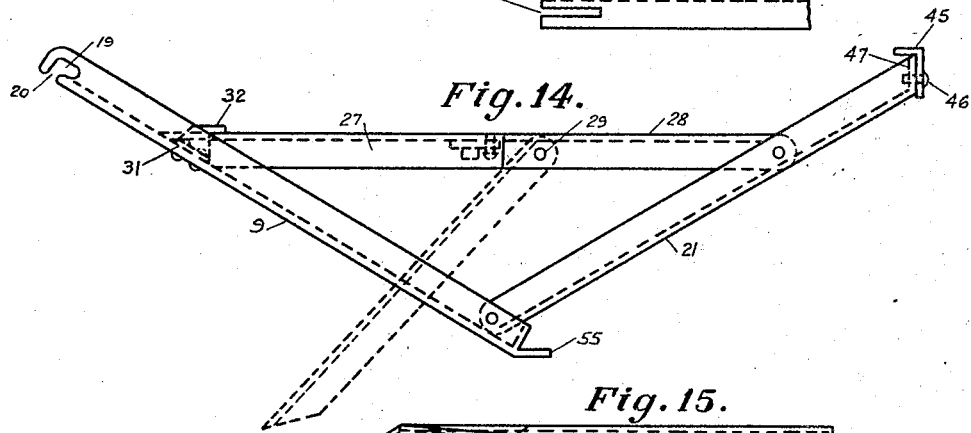
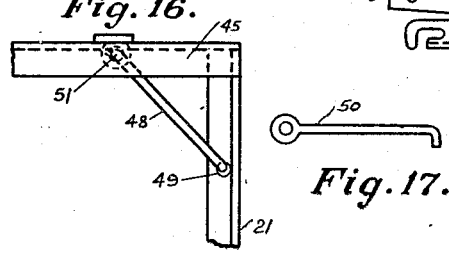

UNITED STATES PATENT OFFICE.

FRANK M. STOLL, OF DENVER, COLORADO.

COLLAPSIBLE BED.

1,327,886.     Specification of Letters Patent.     Patented Jan. 13, 1920.

Application filed February 24, 1919. Serial No. 278,973.

*To all whom it may concern:*

Be it known that I, FRANK M. STOLL, a citizen of the United States, and a resident of the city and county of Denver and State of Colorado, have invented certain new and useful Improvements in Collapsible Beds, of which the following is a full, clear, and exact description, such as will enable others skilled in the art to which the invention appertains to make and use the same.

My invention relates to improvements in collapsible beds, and the invention has for its object the provision of a bed of this character which may be conveniently and quickly collapsed or folded into a relatively small and compact bundle.

Another object of the invention is to provide a collapsible bed primarily intended for use in connection with a motor vehicle and adapted to be carried in some suitable or convenient place on the motor vehicle, preferably on the running board thereof.

Another object of the invention is to provide a collapsible bed adaptable for use of persons traveling by means of motor vehicles, whereby the same may be set up along the highway, or in other convenient places.

Another object of the invention is to provide a collapsible bed, which in the operation of setting up, will operate to stretch the mattress thereof.

Another object of the invention resides in the detail construction of the collapsible frame work of the bed, whereby the frame work in being set up and taken down may be entirely disconnected from the vehicle.

With these and other objects in view, the invention will now be described with reference to the accompanying drawings, which form a part hereof.

In these drawings, Figure 1 is a plan view of the bed; Fig. 2 is a side elevational view thereof; Fig. 3 is a detail view illustrating the aperture, by means of which the side bars of the bed frame are connected with an end member of the bed frame; Fig. 4 is a detail view illustrating the manner in which the side bars of the bed frame are connected with one of the end members thereof; Fig. 5 is a view, showing the running board of an automobile in cross section, and illustrating the manner in which the bed is fastened in position on the running board; Figs. 6 and 7 are views illustrating the manner in which the toggle arms of the bed frame are adapted to be locked in their extended positions; Figs. 8 and 9 are side views showing the jointed extremities of the toggle arms; Fig. 10 is a cross sectional view taken on the line 10—10 of Fig. 8; Fig. 11 is a view of one part of the toggle arm; Fig. 12 is another view of said one part of the toggle arm the same being in another position; Fig. 13 is a view of a portion of one of the side bars of the bed, showing the lug carried thereon, which is engaged by one extremity of the toggle arm; Fig. 14 is a view of one side of the bed frame, illustrating the manner in which the same is set up, or extended; Fig. 15 is a view illustrating one side of the bed frame in its collapsed condition; Fig. 16 is a plan view of one corner of the bed frame, illustrating a brace for the latter; and Fig. 17 is a detail view of the brace employed.

Corresponding and like parts are referred to in the following description, and indicated in all the views of the accompanying drawings by the same reference characters.

Let the numeral 5 represent an end bar of the bed, which, when the bed is being used in connection with an automobile, is adapted to rest upon the running board of the latter, and to be secured to the running board by means of U-shaped clamps 6. See Fig. 5. These U-shaped clamps 6 receive the outer edge of the running board and the outer edge of the end member 5, and by means of a set screw 7, the said U-shaped clamps 6 may be caused to tightly engage the end member 5 with the running board which is herein designated 8. Angle bars 9 and 10 are adapted to be engaged in their extremities with the end member 5 when the bed is set up. For the purpose of engaging the extremities of these angle bars 9 and 10 with the end member 5, the latter is provided with channels 12 and 13 at its opposite extremities, in which the said extremities of the angle bars 9 and 10 are received. These channels 12 and 13 are formed by bending upwardly at right angles the opposite extremities of the end member 5, as shown at 14, and by pivoting to said upwardly bent extremities of the end bar 5, parts 15, which said parts are off set, as shown at 16, and thereby forming the channels 12 and 13. Pins 17 and 18, bridge the channels 12 and 13, the said pins being set into the upwardly bent extremities 14 of the end bar 5 and the members 15. The extremities of the angle bars 9 and 10 which are adapted to be received in the channels 12 and 13, are provided with openings 19 therein, with which said openings 19, gaps 20 communicate, the said gaps 20 being formed in the bottom edge of the angle bars 9 and 10. Thus when these extremities of the angle bars 9 and 10 are placed in the channels 12 and 13, the pins 17 and 18 will be received through the gaps 20 into the openings 19. These openings 19 extend rearwardly from the gaps 20, whereby when the angle bars 9 and 10 are slid forwardly in the channels 12 and 13, the pins 17 and 18 will be received by the openings 19 rearwardly of the gaps 20, and thereby fasten the said extremities of the angle bars 9 and 10 in the channels 12 and 13. When the angle bars 9 and 10 have thus been received and fastened in the channels 12 and 13, the said angles bars extend downwardly and at right angles to the end member 5, the outer extremities thereof engaging the ground, and forming supports for the sides of the bed frame, intermediate the extremities of the bed, as will later be more fully explained. Angle bars 21 and 22 are pivotally connected at their inner extremities to the angle bars 9 and 10 respectively, as shown at 23, the pivotal points 23 but slightly above the lower extremities of the angle bars 9 and 10. By reason of the pivotal connection of the angle bars 21 and 22 with the angle bars 9 and 10, the said angle bars 21 and 22 are adapted to be folded against the angle bars 9 and 10 and received within the angle of the latter, as is shown in Fig. 15. Toggle arms 24 and 25 respectively connect the bars 9 and 21 and 10 and 22 when the bed is in its set up condition, said toggle arms 24 and 25 serving to hold the opposite sides of the bed frame in extended condition against the tension or tautness of a mattress 26. Each of the toggle arms 24 and 25 are of the following construction:

Parts 27 and 28 are pivoted together as shown at 29, the part 27 extending beyond the pivotal point 29 and overlapping the part 28. These parts 27 and 28 are formed of angle members, and the horizontal portion of the angle of the part 27 engages with the top of the part 28, when the two parts 27 and 28 are in their extended positions, whereby the same are so held in their extended positions and in alinement with each other, thereby holding the bed frame against collapsing under the tension of the mattress 26. The part 28 is pivoted at one extremity to the angle bar 21, or 22, as shown at 30, and the parts 27 are adapted to engage with the angle bars 9 and 10, as shown at 31, 31 representing a lug which is secured upon each of the angle bars 9 and 10 and adapted to be engaged by the extremities of the parts 28. These lugs 31 are provided with lips 32, which overlap the upper edges of the parts 28 and prevent the latter from being disengaged from the lugs 31. The part 27 of each toggle arm is provided with a slot 33 therein, which said slots are adapted to receive the lugs 31. The part 28 is provided with a hook 34 on its extremity, which is adapted to be received through an opening 35 in the top of the part 27. A latch 36 is pivoted to the horizontal portion of the angle of the part 28, as shown at 37, said latch 36 being actuated by means of a spring 38 to engage with the hook 34, and thereby lock the two parts 27 and 28 in an alined position and against collapsing in an upward direction. This latch 36 is adapted to engage with a shoulder 39 on the hook 34, whereby the parts 27 and 28 cannot be collapsed until the latch 36 has been disengaged from this shoulder 39. A lip 40 is provided on the latch 36 by means of which the latch 36 may be disengaged from the shoulder 39. A member 41 is secured to the part 28, and engages the latch 36 on the lower side of the latter whereby the latch 36 will not be bent out of position by the movement of the hook 34 into engagement therewith. This hook 34 is provided with a beveled edge 42, whereby the same will slide by the latch 36 and move the latter out of its path until the latch may be received about the shoulder 39, whereupon the spring 38 will actuate the latch 36 into its latching position. A detachable end bar 45 connects the outer extremities of the angle bars 21 and 22, the said detachable end bar having pins 46 at its opposite extremities, which are adapted to be received through perforations in the outer extremities of the angle bars 21 and 22, said perforations being formed in upwardly bent portions 47 of the angle bars 21 and 22. In this manner the detachable end bar 45 is secured to the extremities of said angle bars 21 and 22. The flexible mattress 26 is connected at one extremity to the end member 5, and the other extremity thereof is connected with the detachable end bar 45. Braces 48 are pivoted to the detachable end bar 45, as shown at 51, and the other extremities of these braces 48 are provided with hooks, which are adapted to be received in perforations 49 formed in the angle bars 21 and 22. By means of these braces 48, the bed is braced at the outer corners thereof, and swinging or lateral movement of the bed is thereby prevented.

By detaching the end bar 45 from the angle bars 21 and 22, the flexible mattress 26 may be rolled up around the said detachable end bar 45 and rest upon the end member 5. This detachable end bar 45 is detached by disengaging the braces 48 from the perforations 51 of the angle bars 21 and 22.

When it is desired to set the bed up, the flexible mattress 26 is unrolled, and the detachable end bar first engaged with the extremities of the angle bars 21 and 22, the opposite sides of the frame of the bed having first been extended at right angles to the end member 5. Then by straightening out the toggle arms 24 and 25, the angle bars 21 and 22 are pressed outwardly thereby stretching the flexible mattress 26 upon the frame. The outer, or lower, extremities of the angle bars 9 and 10 are provided with shoes 55, which flatly engage the ground, and thereby prevent the angle bars 9 and 10 from sinking into the ground.

A foot piece 56 is pivoted to the outer extremities of the angle bars 21 and 22, as shown at 57. This foot piece 56 is adapted to be removed when the bed is collapsed. Braces 58 are pivoted to the arms 59 of the foot piece 56, as shown at 60, and the lower extremities of these arms 58 are adapted to engage in the notches 61, which are formed in the outer extremities of the angle bars 21 and 22.

From the foregoing description, it will be understood that the opposite sides of the bed frame are collapsed and placed upon the end member 5 in parallel relation, the extremities of the angle bars 9 and 10 having first been disengaged from channels 12 and 13. The flexible mattress 26 is also carried upon the end member 5, after having first been rolled up around the detachable end bar 45.

While I have described and illustrated herein a specific form of my invention, it is understood that I am not limited thereto, and that the invention may be modified and varied without departing from the spirit of the same or the scope of the appended claims.

Having thus described my invention, what I claim and desire to secure by Letters Patent is:—

1. In a collapsible bed, a frame comprising a horizontal end bar, constituting a support, side bars, each being connected at its inner end with said support and adapted to be downwardly inclined from said support for locking said side bars thereto, said side bars being adapted to be elevated to a horizontal plane whereby they may be disconnected from said end support and disposed to rest on said support in parallel relation to one another, and a second end bar connecting the outer ends of said side bars and being detachable therefrom prior to the placing of said side bars on said support in parallel relation, said second end bar when assembled, being also adapted to rest on said support in parallel relation to the side bars thereon.

2. In a collapsible bed, a frame comprising a horizontal end bar constituting a support, side bars, each adapted to be connected at its inner end with said support and downwardly inclined from the latter whereby said side bars are locked to said support, said side bars being adapted to be elevated so that they may be interlocked and detached from said support and disposed to rest on said support in parallel relation to one another when the same are disconnected from said support, a second end bar connecting the outer ends of said side bars and being detachable therefrom prior to the folding of said side bars, said second end bar when assembled, being parallel to said support, and a flexible bed spring fabric supported by and between said second end bar and said support, said fabric carrying said second end bar and being in turn carried by said support.

3. In a collapsible bed, a frame comprising a horizontal end member, constituting a support, side bars, each adaptable for detachable connection at its inner end with said support, said side bars adapted to be inclined downwardly from their point of connection with said support to form ground engaging means and to lock said side bars to said support, said side bars adpated to be elevated so that they may be interlocked and disconnected from the support and rested on the latter in parallel relation to one another, and an end bar detachably connected with the outer ends of said side bars.

4. An automobile bed, having side members composed of sections pivoted together intermediate the extremities of said side members and adapted to be collapsed longitudinal of each other, an end support upon which corresponding sections of said side members are removably connected so that the same may be disconnected from said end support and rest upon the latter in parallel relation, said side members adapted to be downwardly inclined from their point of connection with the support to form ground engaging means below the pivoted point of said sections and to lock said members to said end support, an end bar adapted for detachable connection to the other sections of said side members at the free ends thereof, and a flexible bed spring fabric supported by and between said end bar and said support, said fabric carrying said end bar and being in turn carried by said support.

5. In a collapsible bed, a frame comprising a horizontal end member, side bars, each having a longitudinal opening in its inner end, said end member having pins adapted to be received in said openings, said side bars after having been engaged in their openings by said pins adapted to be downwardly inclined thereby locking said side bars to said end member, said side bars being adaptable when elevated to an approximately horizontal plane for disconnection with said end member whereby they may be placed on said end member in parallel relation to one another, and a second end bar connecting the outer ends of said side bars and being detachable therefrom prior to the disconnection of said side bars from said end member.

6. In a collapsible bed, a frame comprising a horizontal end member, side bars, each having an opening in its inner end, said end member having pins thereon adapted to be received in said openings, the said side bars adapted to be downwardly inclined from said end member causing said side bars to be locked against said pins, said side bars being adaptable for disconnection with the end member when elevated so that they may be placed upon the end member.

7. A device of the class described, comprising an end member, side bars, the said side bars adapted to be downwardly inclined from said end member, means on said side bars adapted to lock the latter to said end member when said side bars are downwardly inclined, and said side bars being adaptable for disconnection with the end member when elevated.

8. In a collapsible bed, a frame, comprising a horizontal end member, side bars adapted to be downwardly inclined from the said end member and engage the ground, the inner extremities of the said side bars having longitudinal openings therein, said inner extremities of the side bars also having gaps therein communicating with said openings from the lower edge of said side bars, said openings extending rearwardly from said gaps, the end support having channels thereon adapted to receive the inner extremities of said side bars, pins bridging said channels and adapted to be received through said gaps into the openings in said side bars, the said side bars being adapted to be slid forwardly in said channels to receive said pins in said openings rearwardly of the gaps and to then be lowered to their downwardly inclined positions for locking said side bars to said horizontal end member.

In testimony whereof I affix my signature.

FRANK M. STOLL.